(12) United States Patent
Miyakawa et al.

(10) Patent No.: US 11,010,444 B2
(45) Date of Patent: May 18, 2021

(54) ONBOARD NAVIGATION DEVICE AND SPOT SEARCH DEVICE FOR USE WITH THE ONBOARD NAVIGATION DEVICE

(71) Applicant: SUBARU CORPORATION, Tokyo (JP)

(72) Inventors: Haruyo Miyakawa, Tokyo (JP); Akinori Nakamura, Tokyo (JP); Daisuke Ito, Tokyo (JP); Koki Matsumoto, Tokyo (JP); Yuto Aoki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 162 days.

(21) Appl. No.: 16/269,786

(22) Filed: Feb. 7, 2019

(65) Prior Publication Data
US 2019/0303419 A1   Oct. 3, 2019

(30) Foreign Application Priority Data
Mar. 30, 2018   (JP) .............................. JP2018-066780

(51) Int. Cl.
*G06F 16/00*   (2019.01)
*G06F 16/9537*   (2019.01)
(Continued)

(52) U.S. Cl.
CPC ..... *G06F 16/9537* (2019.01); *G01C 21/3679* (2013.01); *G06F 16/252* (2019.01); *G06F 16/29* (2019.01); *G06F 16/9538* (2019.01)

(58) Field of Classification Search
CPC ...... G06F 16/25; G06F 16/29; G06F 16/9538; G06F 16/252; G06F 16/9537;
(Continued)

(56) References Cited

U.S. PATENT DOCUMENTS

2003/0069689 A1* 4/2003 Ihara .................... G09B 29/106
701/455
2003/0171094 A1* 9/2003 Kawai ..................... H04L 67/12
455/3.01
(Continued)

FOREIGN PATENT DOCUMENTS

JP   2006-275736      10/2006
JP   2010-151451 A     7/2010
(Continued)

OTHER PUBLICATIONS

Office Action for JP Patent Application No. 2018-066780, dated Sep. 4, 2019, 03 pages of Office Action and 04 pages of English Translation.
(Continued)

*Primary Examiner* — Anh Ly
(74) *Attorney, Agent, or Firm* — Chip Law Group (57) ABSTRACT

A spot search device includes a device communication unit, a search unit, a generator unit, and a spot search unit. The device communication unit communicates with a server device on a network. The search unit searches over information on the network with the use of the device communication unit. The generator unit generates a genre regarding information on a spot included in a search history of the search unit. The spot search unit searches, over the information on the network, for information on one or more spots around a route of a vehicle, according to the genre generated by the generator unit, with the use of the search unit. The device communication unit transmits the information on the one or more spots around the route, together with information on the route, to an onboard navigation device installed on the vehicle.

9 Claims, 7 Drawing Sheets

(51) Int. Cl.
*G06F 16/29* (2019.01)
*G01C 21/36* (2006.01)
*G06F 16/25* (2019.01)
*G06F 16/9538* (2019.01)

(58) Field of Classification Search
CPC .......... G06F 16/00; G06F 17/30; G06F 17/00; G01C 21/26; G01C 21/3679; G01C 21/34; G01C 21/20; G01C 21/36; G08G 1/0969; G09B 29/10
See application file for complete search history.

(56) References Cited

U.S. PATENT DOCUMENTS

| | | | | |
|---|---|---|---|---|
| 2004/0230376 | A1* | 11/2004 | Ichikawa | G01C 21/26 702/2 |
| 2006/0122770 | A1* | 6/2006 | Sasano | G09B 29/10 701/438 |
| 2007/0198176 | A1* | 8/2007 | Endo | G09B 29/102 701/450 |
| 2009/0005980 | A1* | 1/2009 | Nakao | G01C 21/28 701/414 |
| 2010/0332132 | A1* | 12/2010 | Okude | G08G 1/096838 701/414 |
| 2011/0077854 | A1* | 3/2011 | Fushiki | G01C 21/3469 701/533 |
| 2014/0169638 | A1* | 6/2014 | Toribami | G06K 9/00342 382/107 |
| 2014/0324340 | A1* | 10/2014 | Nishida | H04W 4/48 701/519 |
| 2015/0304439 | A1* | 10/2015 | Morimoto | G06Q 50/01 709/224 |
| 2015/0316389 | A1* | 11/2015 | Inoue | G01C 21/3469 701/521 |
| 2015/0345977 | A1* | 12/2015 | Saito | B60L 3/00 701/521 |
| 2017/0010116 | A1* | 1/2017 | Inoue | B60L 53/62 |
| 2017/0011743 | A1* | 1/2017 | Matsumoto | G10L 15/30 |
| 2018/0025060 | A1* | 1/2018 | Sasaki | G06F 16/24578 707/734 |

FOREIGN PATENT DOCUMENTS

| | | |
|---|---|---|
| JP | 2012-013428 A | 1/2012 |
| JP | 2014-106044 A | 6/2014 |

OTHER PUBLICATIONS

Office Action for JP Patent Application No. 2018-066780, dated May 19, 2020, 3 pages of Office Action and 3 pages of English Translation.

\* cited by examiner

ONBOARD NAVIGATION DEVICE AND SPOT SEARCH DEVICE FOR USE WITH THE ONBOARD NAVIGATION DEVICE

CROSS-REFERENCE TO RELATED APPLICATIONS

The present application claims priority from Japanese Patent Application No. 2018-066780 filed on Mar. 30, 2018, the entire contents of which are hereby incorporated by reference.

BACKGROUND

The technology relates mainly to an onboard navigation device to be installed in a vehicle.

Onboard navigation devices are basically installed in vehicles for use. For example, in response to an input of a destination, an onboard navigation device searches for a route to the destination, and guides a vehicle along the route searched. Reference can be made to Japanese Unexamined Patent Application Publication (JP-A) No. 2006-275736.

SUMMARY

An aspect of the technology provides a spot search device including a device communication unit, a search unit, a generator unit, and a spot search unit. The device communication unit communicates with a server device on a network. The search unit searches over information on the network with the use of the device communication unit. The generator unit generates a genre regarding information on a spot included in a search history of the search unit. The spot search unit searches, over the information on the network, for information on one or more spots around a route of a vehicle, according to the genre generated by the generator unit, with the use of the search unit. The device communication unit transmits the information on the one or more spots around the route, together with information on the route, to an onboard navigation device installed on the vehicle.

An aspect of the technology provides an onboard navigation device to be installed in a vehicle for route guidance. The onboard navigation device includes a reception unit, an acquisition unit, a reception extraction unit, and a display. The reception unit receives information on one or more spots around a route of the vehicle, together with information on the route. The one or more spots are associated with respective ones of a plurality of sections into which the route is divided. The acquisition unit acquires a current position of the vehicle. The reception extraction unit extracts, from the information on the one or more spots received by the reception unit, information on a spot included in one of the plurality of the sections that includes the current position. The current position is acquired by the acquisition unit. The display displays the information on the spot extracted by the reception extraction unit.

DETAILED DESCRIPTION

In the following, some implementations of the technology are described with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same numerals to avoid redundant description.

Onboard navigation devices to be installed in vehicles have a plurality of pieces of spot information in order to make it possible to search for a destination.

Meanwhile, in an actual society, some spots such as new shops are set up, while some spots that existed in the past disappear.

Onboard navigation devices are, therefore, able to update navigation data such as spot data on a regular basis.

But the actual society constantly changes, and the changes appear more rapid these days.

In order to keep a deviation between contents of, for example, the spot data and the actual society as small as possible, one of possible measures to be taken by onboard navigation devices may be to search for spot information over a network such as the Internet. Information on the network is considered to optimally follow the changes in the actual society. Utilization of the information on the network is, therefore, expected to allow for spot searches in association with the actual society.

However, onboard navigation devices are fixedly installed in vehicles. Even a newest model of an onboard navigation device at the time of installment in a vehicle may be of low performance in only a few years.

In contrast, the information on the network such as the Internet is frequently updated in a short period of time.

Moreover, in an information society these days, not only an amount of information increases drastically, but also quality of the information rapidly changes toward a higher level of richness in a short period of time.

Accordingly, even if onboard navigation devices are able to search for the spot information over the network such as the Internet, resources of the onboard navigation devices, e.g., a memory and a central processing unit (CPU), may become out of date, failing to cope with information of a new level of quality. Therefore, a period of time during which the onboard navigation devices substantially keep their ability to search over the network is considered to be very short. Even if software and/or firmware of the onboard navigation devices are updated, possibility is not low that after a few years they will fail in coping with information of a new era. Keeping the onboard navigation devices capable of searching over the information on the network such as the Internet may involve frequent and short-term renewals of the onboard navigation devices to be fixedly installed in the vehicles, as with normal computer devices and mobile terminals.

Furthermore, it is not easy for a user to search over a huge amount of unsorted information on the Internet, and to find and extract information desired for utilization in route guidance using the onboard navigation devices. If such a search is made on the onboard navigation devices having only limited resources, it is not easy for a user to acquire desired spot information.

As described, what is desired for an onboard navigation device to be installed in a vehicle is to allow for optimal and long-term utilization of information on a network such as the Internet.

First Implementation

Figure 1:
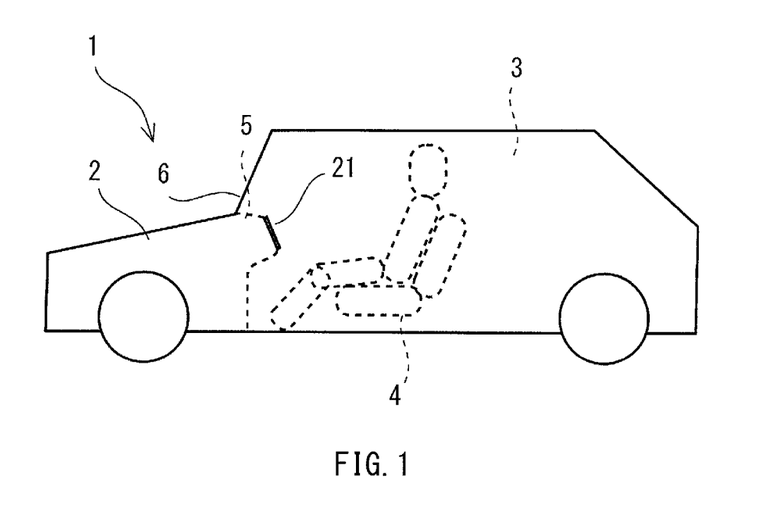
FIG. 1 illustrates an example of an automobile to which an example implementation of the technology is applicable.

FIG. 1 illustrates an automobile 1 to which an example implementation of the technology is applicable.

In one implementation, the automobile 1 may serve as a "vehicle".

Referring to FIG. 1, the automobile 1 may include a vehicle body 2. The vehicle body 2 may include a cabin 3. An occupant may get in the cabin 3, and be seated on a seat 4.

The automobile 1 illustrated in FIG. 1 may utilize an onboard navigation device 21. In FIG. 1, the onboard navigation device 21 may be fixedly attached to a middle part of a dashboard 5. The dashboard 5 may be located in front of the occupant seated on the seat 4.

For example, upon an input of a destination, the onboard navigation device 21 may search for a route to the destination, and guide the automobile 1 along the route searched.

The onboard navigation device 21 installed in the automobile 1 may have a plurality of pieces of spot data in order to make it possible to search for the destination.

Meanwhile, in the actual society, some spots such as new shops are set up, while some spots that existed in the past disappear.

The onboard navigation device 21 may, therefore, be able to update navigation data such as the spot data on the regular basis.

But the actual society constantly changes, and the changes appear more rapid these days.

In order to keep the deviation between the contents of, for example, the spot data and the actual society as small as possible, one of possible measures to be taken by the onboard navigation device 21 may be to acquire the spot data by searching over the Internet 42.

Information on the Internet 42 is considered to optimally follow the changes in the actual society. Utilization of the information on the Internet 42 is, therefore, expected to allow for spot searches in association with the actual society.

However, the onboard navigation device 21 is to be fixedly installed in the automobile 1. Even a newest model of the onboard navigation device 21 at the time of installment in the automobile 1 may be of low performance in only a few years.

In contrast, the information on the Internet 42 is frequently updated in a short period of time.

Moreover, in the information society these days, not only an amount of the information on the Internet 42 increases drastically, but also quality of the information on the Internet 42 rapidly changes toward a higher level of richness in a short period of time.

Accordingly, even if the onboard navigation device 21 is able to search for the spot data over the Internet 42, resources of the onboard navigation device 21, e.g., a memory and a CPU, may become out of date, failing to cope with information of a new level of quality. Therefore, a period of time during which the onboard navigation device 21 substantially keeps its ability to search over the Internet 42 is considered to be very short. Even if software and/or firmware of the onboard navigation device 21 are updated, after a few years they will fail in coping with information of a new era.

Keeping the onboard navigation device 21 capable of searching over the information on the Internet 42 may involve frequent and short-term renewals of the onboard navigation device 21 to be fixedly installed in the automobile 1, as with normal computer devices and mobile terminals.

Furthermore, it is not easy to search over a huge amount of unsorted information on the Internet 42, and to find and extract information available for route guidance using the onboard navigation device 21.

If such search processing involving a huge amount of information is executed on the onboard navigation device 21 having only limited resources, not every user is able to acquire desired spot data.

As described, what is desired for the onboard navigation device 21 to be installed in the automobile 1 is to allow for optimal and long-term utilization of information on the Internet 42.

Figure 2:
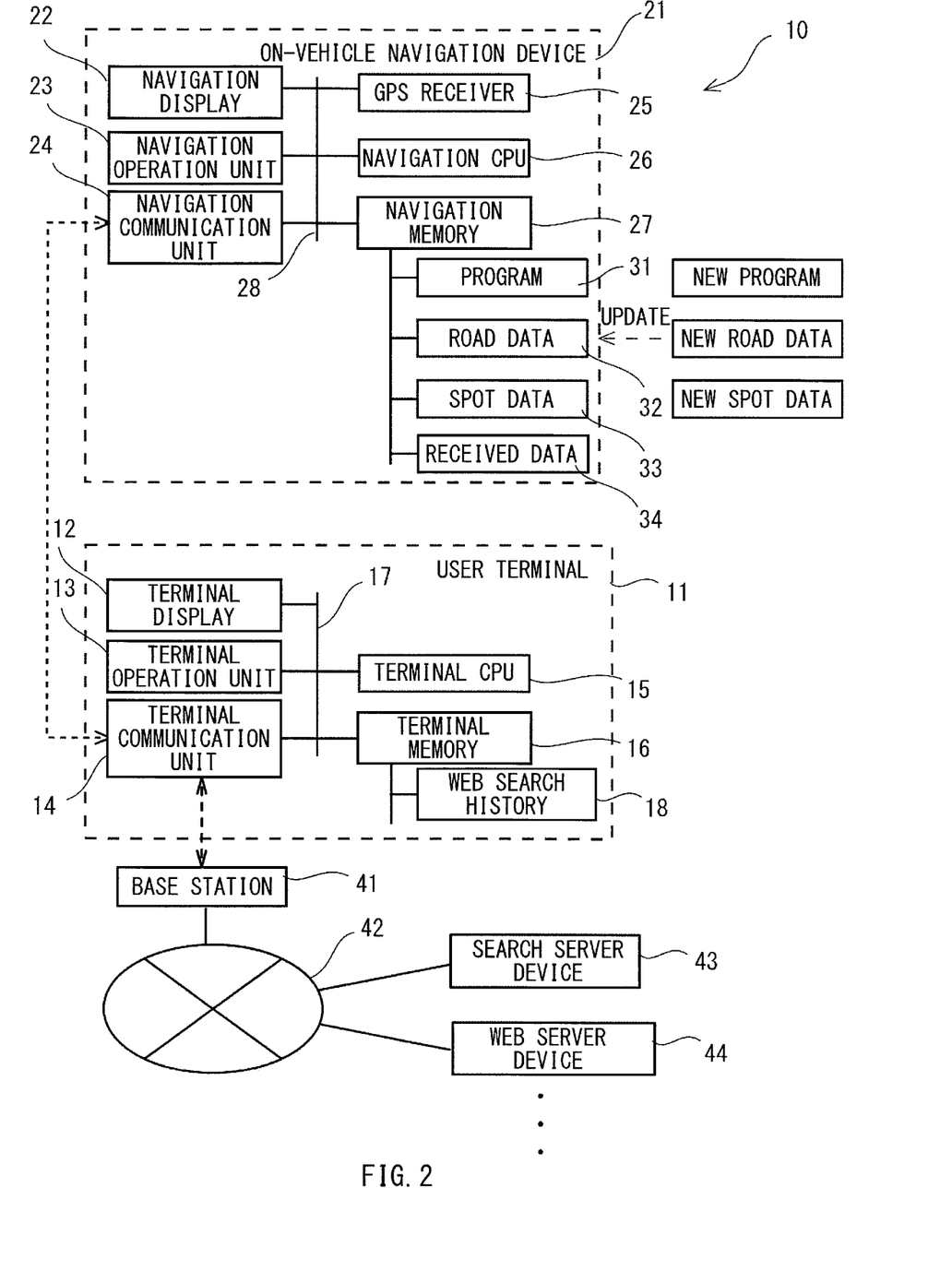
FIG. 2 is a block diagram illustrating an example of a navigation system including an onboard navigation device according to a first implementation of the technology.

FIG. 2 illustrates a navigation system 10 including the onboard navigation device 21 according to the first implementation of the technology.

The navigation system 10 may include the onboard navigation device 21 and a user terminal 11. The user terminal 11 may execute spot search processing.

The user terminal 11 may include a terminal display 12, a terminal operation unit 13, a terminal communication unit 14, a terminal CPU 15, a terminal memory 16, and a terminal bus 17. The terminal bus 17 may couple them together, allowing for data communication with one another.

Non-limiting examples of the user terminal 11 may include a mobile information terminal and a computer device. The mobile information terminal may be carried by a user. The computer device may be used by a user, for example, at home.

The terminal communication unit 14 may include, for example, a wireless communication device or a wired communication device. The terminal communication unit 14 may perform data communication with a base station 41 by, for example, wireless communication. The base station 41 may be coupled to the Internet 42. In addition, for example, a search server device 43 and a web server device 44 may be coupled to the Internet 42. The web server device 44 may disclose web pages that publish information regarding, for example, shops, on their respective uniform resource locators (URL) assigned univocally on the Internet 42. The web page may normally include description of products and/or services provided by a shop and information regarding addresses and telephone numbers that indicates a location of the shop. The search server device 43 may collect, in advance and on a regular basis, information on the web pages disclosed on the Internet 42.

For example, the terminal communication unit 14 of the user terminal 11 may transmit, to the search server device 43, a search request that specifies, for example, a name of a shop. The search server device 43 may set the name of the shop included in the search request as a search condition, and extract information on the web page including the name of the shop, from information on the web pages collected. The search server device 43 may transmit, to the terminal communication unit 14 of the user terminal 11, the information on the web page that includes the name of the shop and is extracted by the search, as a response to the search request. The terminal communication unit 14 may be able to communicate with a server device on the Internet 42.

The terminal display 12 may include, for example, a liquid crystal display device or a monitor device. The terminal display 12 may display, for example, a search image and a display image of a search result. The search image is provided for searching over the information on the Internet 42 by the search server device 43. The display image of the search result may provide, for example, list display of a plurality of web pages received as the response to the search request.

The terminal operation unit 13 may include, for example, a touch panel device, a keyboard device, a pointing device, or a sound recognition device, or any combination thereof. The terminal operation unit 13, together with the terminal display 12, may constitute a user interface. The terminal operation unit 13 may select one of the web pages from the list display, on the basis of the display provided by the terminal display 12.

The terminal memory 16 may include, for example, a hard disk device and/or a semiconductor memory device. The terminal memory 16 may store a program 31 and/or data the terminal CPU 15 utilizes in, for example, the spot search processing.

FIG. 2 illustrates data of a web search history 18, as an example of the data to be stored in the terminal memory 16. The data of the web search history 18 may be data including accumulation of web pages for which the user searched in the past with the use of the user terminal 11.

The terminal CPU 15 may read the program 31 stored in the terminal memory 16, and execute the program 31. Thus, the terminal CPU 15 may serve as a controller of the user terminal 11. The terminal CPU 15 may use devices as resources of the terminal communication unit 14, through the terminal bus 17, to execute processing based on the program 31.

For example, the terminal CPU 15 searches over the information on the Internet 42 with the use of the terminal communication unit 14. Thus, the data of the web search history 18 may be generated or updated.

In addition, for example, the terminal CPU 15 may generate the route of the automobile 1.

In addition, for example, the terminal CPU 15 searches, over the information on the Internet 42, for spot data around the route, with the use of the terminal communication unit 14.

In one implementation, the spot data around the route may serve as "information on one or more spots around a route of a vehicle".

In addition, for example, the terminal CPU 15 transmits, to the onboard navigation device 21, the spot data searched regarding the surroundings of the route, together with information on the route generated, with the use of the terminal communication unit 14.

The onboard navigation device 21 may include a navigation display 22, a navigation operation unit 23, a navigation communication unit 24, a global positioning system (GPS) receiver 25, a navigation CPU 26, a navigation memory 27, and a navigation bus 28. The navigation bus 28 may couple them together, allowing for data communication with one another.

The onboard navigation device 21 is to be installed in the automobile 1, and may guide the automobile 1 along the route.

The navigation communication unit 24 may include, for example, a wireless communication device. The navigation communication unit 24 may perform data communication with the terminal communication unit 14 of the user terminal 11, by, for example, wireless communication. The navigation communication unit 24 may receive, for example, the destination, the route, and the spot data around the route from the terminal communication unit 14.

The navigation display 22 may include, for example, a liquid crystal display device, a head mount display device, or a projection display device that projects images onto a front windshield 6 of the automobile 1. The navigation display 22 may display, for example, a route guidance image to the destination and a spot guidance image around the route.

The navigation operation unit 23 may include, for example, a touch panel device or a sound recognition device, or both. The navigation operation unit 23, together with the navigation display 22, may constitute a user interface. The navigation operation unit 23 may select, for example, one of the spots around the route, on the basis of display provided by the navigation display 22.

The GPS receiver 25 may receive electromagnetic waves from a plurality of GPS satellites, and generate positional information of a current position of the automobile 1.

The navigation memory 27 may include, for example, a hard disk device or a semiconductor memory device, or both. The navigation memory 27 may store the program 31 and data the navigation CPU 26 utilizes in, for example, spot navigation processing.

FIG. 2 illustrates, as an example of the data to be stored in the navigation memory 27, data of the program 31, road data 32, spot data 33 such as shops, and received data 34. The road data 32 may include data regarding roads on which the automobile 1 is able to or permitted to travel. The received data 34 may include data the navigation communication unit 24 has received from the user terminal 11. Non-limiting examples of the received data 34 may include the destination, the route, and the spot data around the route. The data of the program 31 to be stored in the navigation memory 27 may be able to be updated with data of a new version of the program 31. The road data 32 to be stored in the navigation memory 27 may be able to be updated with a new piece of the road data 32. The spot data 33 to be stored in the navigation memory 27 may be able to be updated with a new piece of the spot data 33.

The navigation CPU 26 may read the program 31 stored in the navigation memory 27, and execute the program 31. Thus, the navigation CPU 26 may serve as a controller of the onboard navigation device 21. The navigation CPU 26 may use devices as resources of the onboard navigation device 21, through the navigation bus 28, to execute processing based on the program 31.

For example, the navigation CPU 26 may display the route to the destination on a map, and provide guidance.

In addition, for example, the navigation CPU 26 may receive data such as the destination, the route, and the spot data around the route, from the user terminal 11 with the use of the navigation communication unit 24. The navigation CPU 26 may allow the navigation memory 27 to store the data received. Thus, the destination, the route, and the spot data around the route searched by the user terminal 11 may be stored in the navigation memory 27.

In addition, for example, the navigation CPU 26 may execute navigation processing with the use of the spot data 33 and the received data 34 stored in the navigation memory 27. The navigation processing may include displaying, for example, information on spots around the current position, on the navigation display 22.

Description is given next of operation of the navigation system 10 having the configuration as mentioned above.

Figure 3:
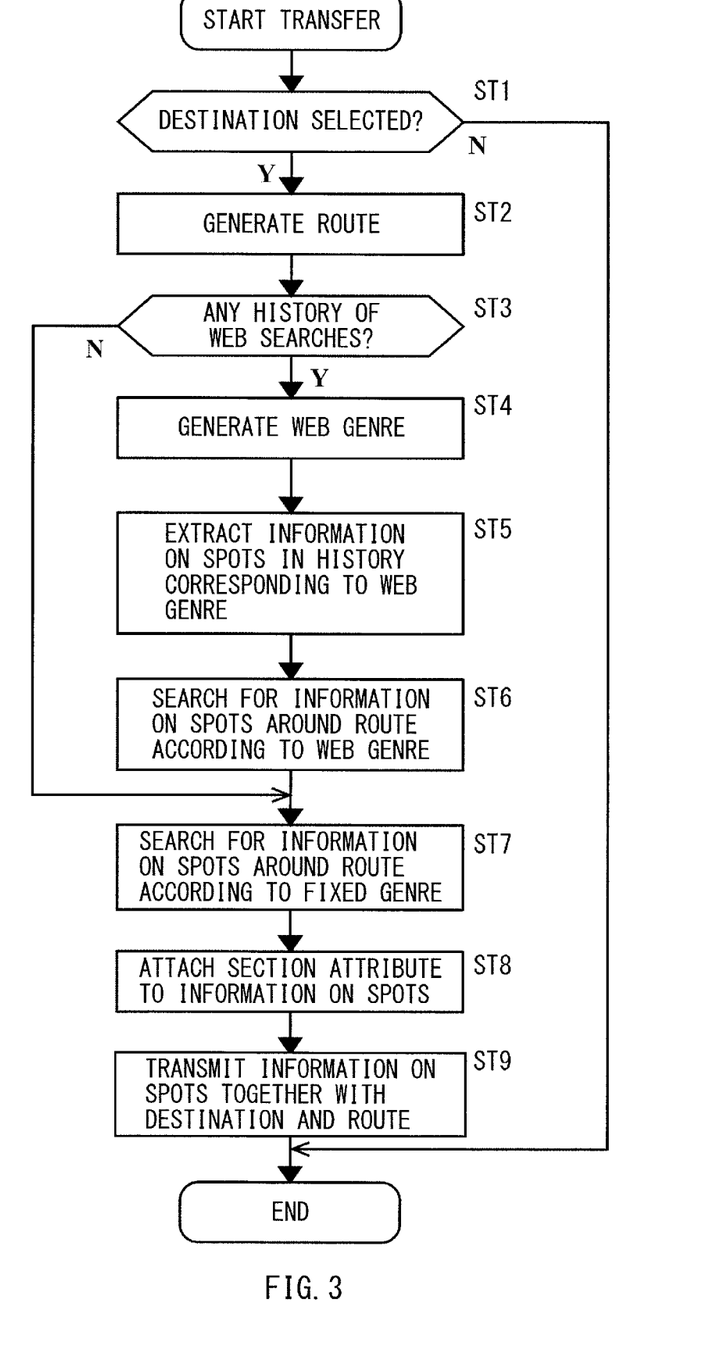
FIG. 3 is a flowchart of an example of spot search processing to be executed by a user terminal illustrated in FIG. 2 before transferring, to the onboard navigation device, data searched and extracted by the user terminal on behalf of the onboard navigation device.

FIG. 3 is a flowchart of an example of the spot search processing to be executed by the user terminal 11 illustrated in FIG. 2 before transferring, to the onboard navigation device 21, the data searched and extracted by the user terminal 11 on behalf of the onboard navigation device 21.

The terminal CPU 15 of the user terminal 11 may repetitively execute the processing illustrated in FIG. 3.

In the spot search processing illustrated in FIG. 3, the terminal CPU 15 may determine whether or not the destination has been selected on the user terminal 11 (step ST1).

In a case where no destination has been selected (step ST1: N), the terminal CPU 15 may terminate the processing in FIG. 3.

In a case where the destination has been selected (step ST1: Y), the terminal CPU 15 may generate the route from the current position of the user terminal 11 or the onboard navigation device 21 to the destination, with the use of the road data 32 stored in the terminal memory 16 (step ST2).

After generating the route to the destination, the terminal CPU 15 may determine presence or absence of the web search history 18 in the terminal memory 16 (step ST3).

On the user terminal 11, making a search over the information on the Internet 42 causes data of web pages accessed by the search to be stored in the terminal memory 16, as the web search history 18.

In a case with the absence of the web search history 18 (step ST3: N), the terminal CPU 15 may bring the processing to step ST7 described later.

In a case with the presence of the web search history 18 (step ST3: Y), the terminal CPU 15 may search for information on spots that are of a genre included in the web search history 18 and are located around the route generated.

In one specific but non-limiting example, the terminal CPU 15 may, first, extract information on any spot included in the web search history 18, and generate a web genre regarding a service and/or a product provided by a shop located at the relevant spot (step ST4).

For example, in a case where the web search history 18 includes information on an Italian restaurant, the terminal CPU 15 may generate, as the web genre, a genre of, for example, Western food.

It is to be noted that the terminal CPU 15 may generate, as the web genre, a genre of, for example, restaurants or Italian restaurants.

The terminal CPU 15 may generate the web genre by, for example, selecting the most appropriate one from a web genre list set in advance.

Thereafter, the terminal CPU 15 may extract information on spots included in the web search history 18, according to the web genre generated (step ST5).

Moreover, the terminal CPU 15 may search over the information on the Internet 42 according to the web genre generated, and search for information on spots located around the route generated (step ST6).

The terminal CPU 15 may determine whether or not a spot acquired from the Internet 42 is located around the route generated, as follows. The terminal CPU 15 may calculate a distance from the route to a spot, and search for whichever spot has a distance of a predetermined value or shorter, as a spot located near the route. In an alternative, the terminal CPU 15 may search for whichever spot is included in a section set in advance on the basis of the route, as the spot located near the route.

Figure 4:
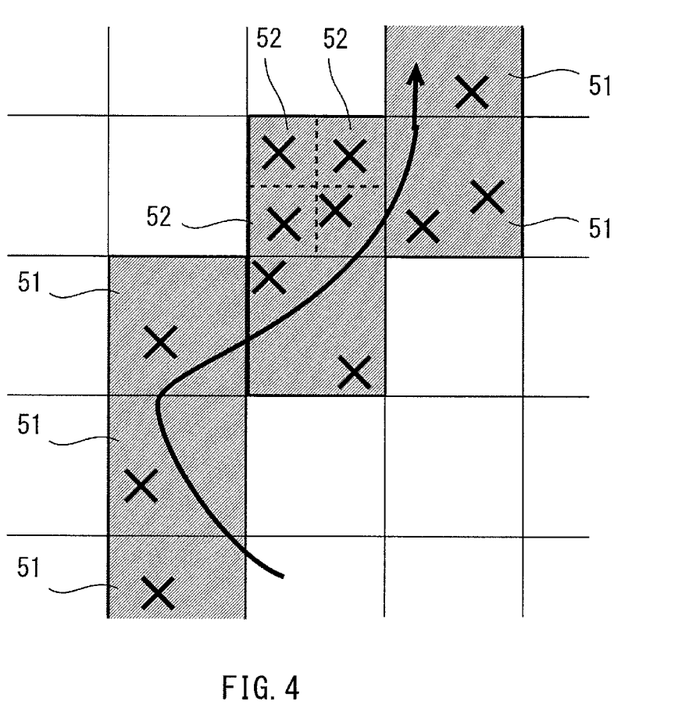
FIG. 4 illustrates sections that sort spots according to regions.

FIG. 4 illustrates sections 51 that sort the spots according to regions.

An area illustrated in FIG. 4 may be divided into a plurality of the regions 51 of a square shape. The route may pass through some of the regions 51 which are shaded. Thus, the route may be divided into the plurality of the regions 51.

In this case, the terminal CPU 15 may search for whichever spot has an address in the shaded regions 51, as the spot located around the route.

After searching for the information on the spots located around the route, the terminal CPU 15 may search over the information on the Internet 42 according to a fixed genre set in advance, and search for information on spots that belong to the fixed genre and that are located around the route generated (step ST7).

It is to be noted that in the case with the determination of the absence of the web search history 18 in step ST3 (ST3: N), the terminal CPU 15 may also search over the information on the Internet 42 according to the fixed genre set in advance, and search for the information on the spots that belong to the fixed genre and that are located around the route generated.

After searching for the information on the spots of the fixed genre, the terminal CPU 15 may attach a section attribute to each piece of the information on the spots extracted or searched in the forgoing processing (step ST8). The section attribute is provided for identification of whichever section 51 each of the spots in FIG. 4 belongs to, in order to associate the spots with respective ones of the sections 51.

In one implementation, the section attribute may serve as "section information".

The section attribute may be any attribute information insofar as is able to univocally specify one of the sections 51. For example, assuming that the upper left section 51 in FIG. 4 is of the section attribute (0, 0), the section attribute may be incremented one by one downward or rightward.

In an alternative, the section attribute may be information on a latitude and a longitude of each of the sections 51.

After the attachment of the section attribute, the terminal CPU 15 may transmit, to the onboard navigation device 21, what has been obtained in the forgoing processing, i.e., the destination, the route, and the spot data on the plurality of the spots (step ST9).

The terminal communication unit 14 may transmit the data to the navigation communication unit 24.

The navigation memory 27 of the onboard navigation device 21 may store the data received by the navigation communication unit 24.

Thus, the destination, the route, and the spot data on the plurality of the spots may be stored, as the received data 34, in the navigation memory 27. The destination and the route may be set in the user terminal 11.

Figure 5:
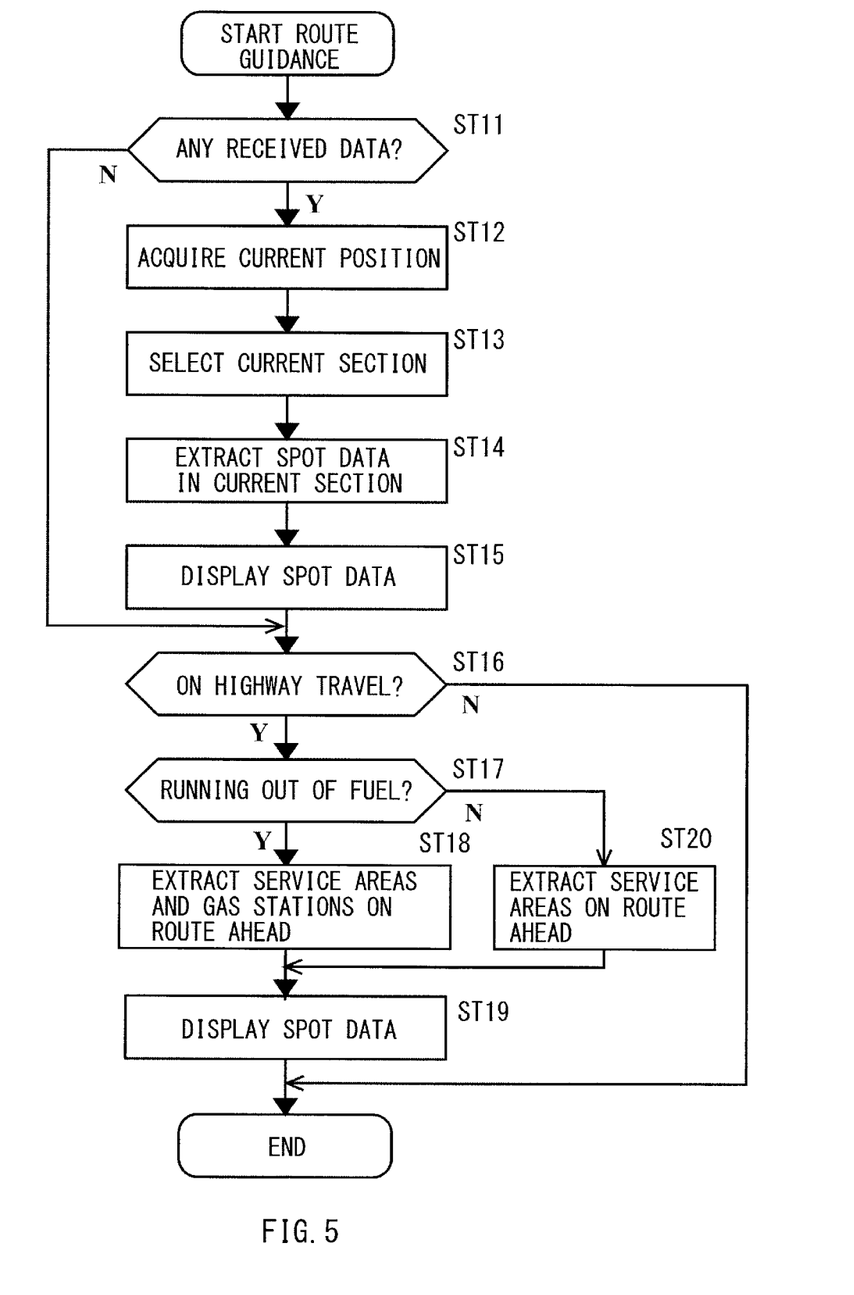
FIG. 5 is a flowchart of an example of spot navigation processing to be executed by the onboard navigation device illustrated in FIG. 2 after receiving the data.

FIG. 5 is a flowchart of an example of the spot navigation processing to be executed by the onboard navigation device 21 in FIG. 2 after receiving the data.

The navigation CPU 26 of the onboard navigation device 21 may repetitively execute the processing in FIG. 5.

In the spot navigation processing in FIG. 5, the navigation CPU 26 may, first, determine presence or absence of the received data 34 (step ST11).

In a case of the absence of the received data 34 (step ST11: N), the navigation CPU 26 may bring the processing to step ST16.

In a case of the presence of the received data 34 (step ST11: Y), the navigation CPU 26 may execute the spot navigation processing based on the received data 34.

In the spot navigation processing based on the received data 34, the navigation CPU 26 may acquire the positional information on the current position, from the GPS receiver 25 (step ST12).

Thereafter, the navigation CPU 26 may select a current section, i.e., the section including the current position, from the plurality of the sections 51 in FIG. 4 (step ST13).

Thereafter, the navigation CPU 26 may extract the spot data included in the current section, from a plurality of pieces of the spot data included in the received data 34 (step ST14).

Thereafter, the navigation CPU 26 may display, on the navigation display 22, the spot data extracted (step ST15).

Figure 6:
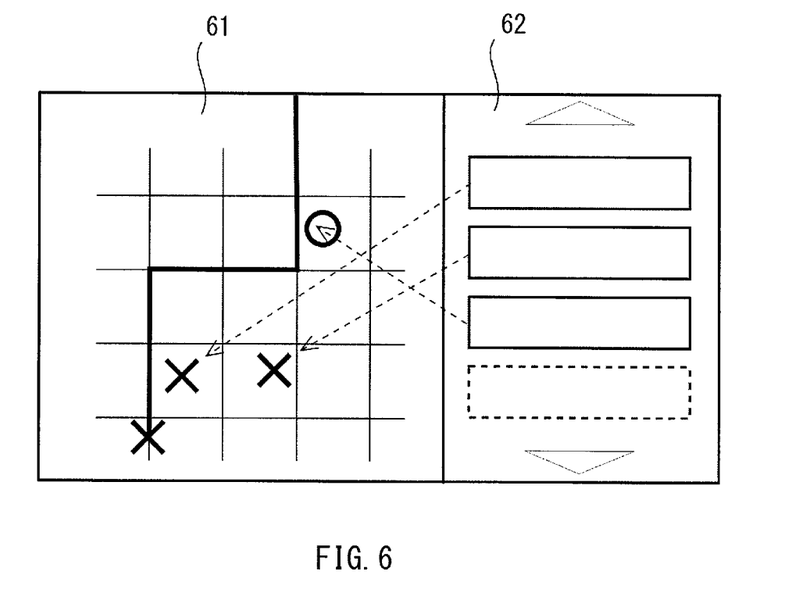
FIG. 6 illustrates an example of a spot guidance image to be displayed on a navigation display illustrated in FIG. 2.

FIG. 6 illustrates an example of the spot guidance image to be displayed on the navigation display 22 illustrated in FIG. 2.

Referring to FIG. 6, the spot guidance image may include a left divided image 61 and a right divided image 62. The left divided image 61 may display a map, with the current position and the route superimposed thereon.

The right divided image 62 may provide list display of the information on the plurality of the spots. Specifically, the navigation CPU 26 may provide, on the right divided image 62, the list display of information on the spot data extracted. Non-limiting examples of the information on the spot data extracted may include the genre and a name of the spot data.

Figure 7:
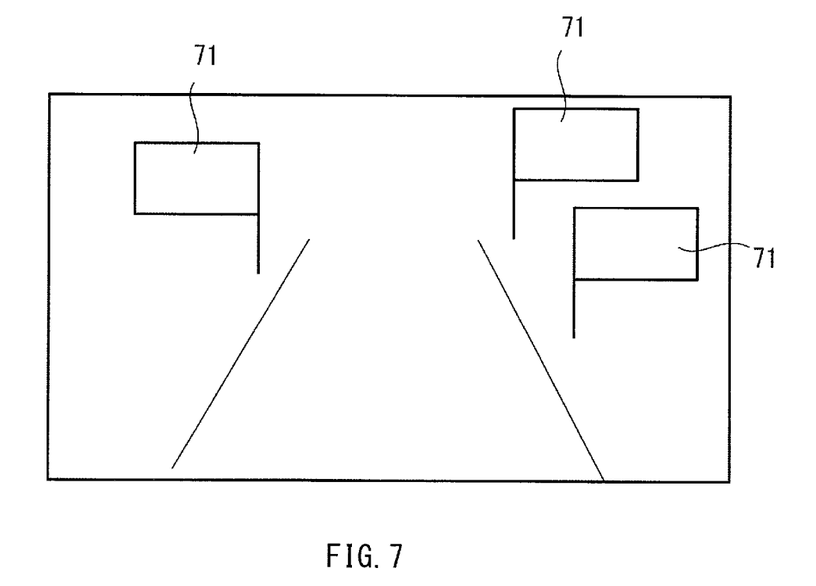
FIG. 7 illustrates another example of the spot guidance image to be displayed on the navigation display illustrated in FIG. 2.

FIG. 7 illustrates another example of the spot guidance image to be displayed on the navigation display 22 illustrated in FIG. 2.

The navigation CPU 26 may switch the display on the navigation display 22 between the spot guidance image in FIG. 6 and the spot guidance image in FIG. 7, on the basis of, for example, setting provided by a user.

In FIG. 7, a course ahead of the current position may be displayed in a bird's eye view. The navigation CPU 26 may set up flag marks 71 or balloons at positions of the addresses of the spot data to be displayed in the bird's eye view. The navigation CPU 26 may display the information on the spot data, e.g., the genre and/or the name, by assigning the information on the spot data to a corresponding one of the flag marks 71 or the balloons.

After the spot navigation processing based on the received data 34, the navigation CPU 26 may determine whether or not the automobile 1 is on highway travel (step ST16).

In a case where the automobile 1 is not on the highway travel (step ST16: N), the navigation CPU 26 may terminate the processing in FIG. 5.

In a case where the automobile 1 is on the highway travel (step ST16: Y), the navigation CPU 26 may further determine whether or not an amount of fuel of the automobile 1, e.g., gasoline, is smaller than a predetermined value (step ST17).

In a case where the amount of the remaining fuel is smaller than the predetermined value (step ST17: Y), the navigation CPU 26 may extract, from the spot data 33 in the navigation memory 27, the spot data 33 on service areas and gas stations on the route ahead (step ST18).

The navigation CPU 26 may display, on the navigation display 22, information on the service areas and the gas stations extracted from the spot data 33 in the navigation memory 27, e.g., genres or names of the service areas and the gas stations (step ST19).

At this occasion, for example, in a case where the spot guidance image as illustrated in FIG. 6 or 7 has been already displayed, the navigation CPU 26 may additionally display the spots based on the spot data 33 in the navigation memory 27, together with the spots based on the received data 34.

For example, in the list display in FIG. 6, the upper two spots may be the spots based on the received data 34. The third spot from the top may be the spot based on the spot data 33 in the navigation memory 27.

In a case where the amount of the remaining fuel is not smaller than the predetermined value (step ST17: N), the navigation CPU 26 may extract, from the spot data 33 in the navigation memory 27, the spot data 33 on the service areas on the route ahead (step ST20).

The navigation CPU 26 may display, on the navigation display 22, information on the service areas extracted from the spot data 33 in the navigation memory 27, e.g., the genres or the names of the service areas (step ST19).

At this occasion, for example, in the case where the spot guidance image as illustrated in FIG. 6 or 7 has been already displayed, the navigation CPU 26 may additionally display the spots based on the spot data 33 in the navigation memory 27, together with the spots based on the received data 34.

Thereafter, the navigation CPU 26 may terminate the processing in FIG. 5.

As described, in this implementation, the user terminal 11 transmits, from the terminal communication unit 14 to the onboard navigation device 21, the spot data around the route, together with the information on the route. The spot data around the route may be obtained by searching over the information on the Internet 42.

It is, therefore, unnecessary for the onboard navigation device 21 installed in the automobile 1 to search for the route or search over the information on the Internet 42, directly by itself. It is possible for the onboard navigation device 21 installed in the automobile 1 to use the spot data obtained from the information on the Internet 42, even if the contents of the data maintained in itself deviate from the actual society, even if the information on the Internet 42 is updated, or even if the resources becomes out of date.

In addition, instead of transmitting the route and the spot data simply as they are, the user terminal 11 may search for the spot data around the route, and transmit, to the onboard navigation device 21, the spot data around the route together with the information on the route. Hence, it is possible for the onboard navigation device 21 to effectively use the spot data around the route inside the automobile 1.

In particular, the spot data around the route may be searched according to the web genre based on the web search history 18 made by the user on the user terminal 11. Hence, it is possible to integrate information on the spots in which the user is considered to be interested, and to transmit the information to the onboard navigation device 21. It is possible to narrow down the spot data that is considered to have high utility value for the user, and transmit the spot data thus narrowed down.

Thus, searching over the information on the Internet 42 for the spot data around the route that is expected to have the high utility value for the user makes it possible to reduce an amount of information to be transmitted to the onboard navigation device 21. This leads to reduction in a transmission load and a storage load on the onboard navigation device 21.

It is possible for the onboard navigation device 21, though fixedly installed in the automobile 1, to expect the optimal and long-term utilization of the information on the Internet 42.

In this implementation, the section attribute may be attached to the spot data around the route searched. The section attribute includes the plurality of the sections 51 into which the route is divided. Hence, it is possible for the onboard navigation device 21 installed in the automobile 1 to extract, with the use of the section attribute thus attached, the spot data in units of the sections 51 for effective use. For example, it is possible to easily extract the information on the section 51 including the current position, from the plurality of pieces of the spot data received, and to display the information extracted.

In this implementation, the terminal CPU 15 may search for the spots around the route by web search according to the fixed genre set in advance. This makes it possible for the terminal CPU 15 to constantly transmit predetermined kinds of information to the onboard navigation device 21 even if nothing related to the predetermined kinds of information is left in the web search history 18. Accordingly, for example, as for the spot data of a predetermined genre that is likely to be used by the user during travel by the automobile 1, it is possible for the terminal CPU 15 to transmit them to the onboard navigation device 21 at all times. Non-limiting examples of the genre that is highly likely to be used by the user during travel by the automobile 1 may include gas stations and service areas.

In this implementation, the onboard navigation device 21 is to be installed in the automobile 1 for the route guidance. The onboard navigation device 21 may extract, on the basis of the section 51 including the current position acquired, the spot data included in the current section, i.e., the section including the current position, from the spot data transmitted by the user terminal 11 and received by the navigation communication unit 24. The onboard navigation device 21 may display the spot data extracted, on the navigation display 22.

Hence, in the onboard navigation device 21, it is possible to display, on the navigation display 22, the spot data on the spots near the current position. The spot data on the spots near the current position is narrowed down on the basis of the section including the current position. It is possible for the onboard navigation device 21 to display the spot data of high utility at the current position.

In this implementation, the onboard navigation device 21 may further extract, on the basis of the current position, the spot data 33 stored in the navigation memory 27 of the onboard navigation device 21. The onboard navigation device 21 may display the spot data 33 extracted.

Hence, in the onboard navigation device 21, it is possible to display the spot data 33 maintained in the onboard navigation device 21, together with, for example, the spot data received. It is not necessary that the spot data 33 maintained in the onboard navigation device 21 is sorted according to the sections 51. It is possible to prevent reduction in an amount of information with which the user is provided.

Second Implementation

Described next is the navigation system 10 according to a second implementation of the technology. In what follows, description is mainly given of differences from the first implementation. Configurations common to those of the first implementation are denoted by the same reference characters, and description thereof is omitted.

Figure 8:
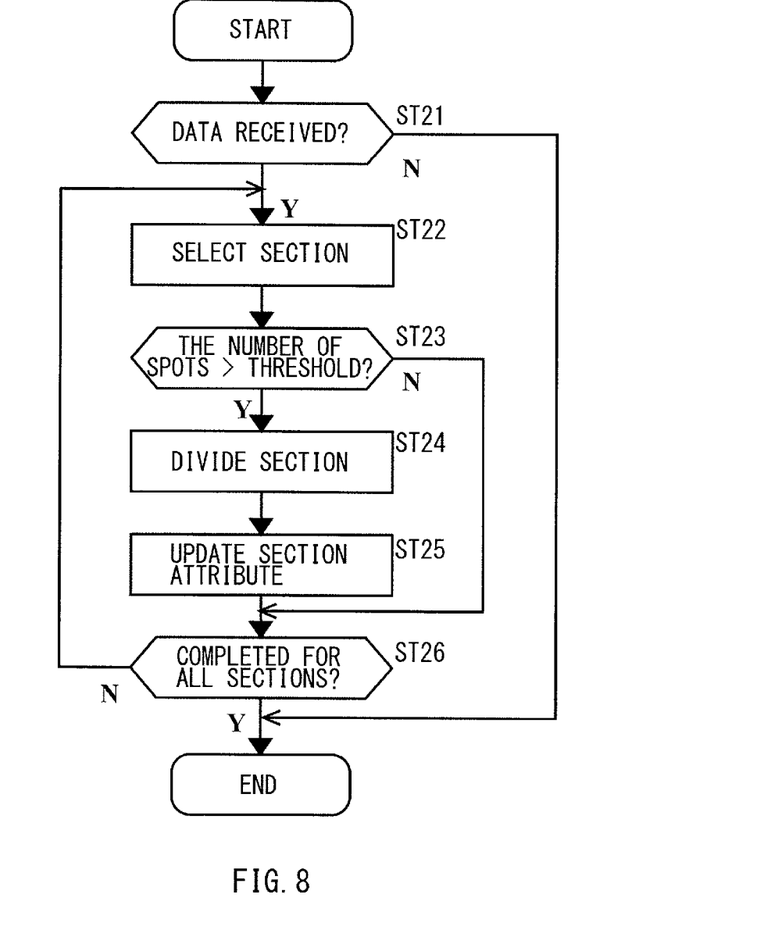
FIG. 8 is a flowchart of an example of re-dividing processing to be executed by an onboard navigation device according to a second implementation of the technology in receiving data from a user terminal.

FIG. 8 is a flowchart of an example of re-dividing processing to be executed when the onboard navigation device 21 according to the second implementation of the technology receives the received data 34 from the user terminal 11.

The navigation CPU 26 of the onboard navigation device 21 may repetitively execute the processing in FIG. 8.

In the re-dividing processing in FIG. 8, the navigation CPU 26 may, first, determine whether or not the received data 34 has been received from the user terminal 11 (step ST21).

In a case where the received data 34 has not been received from the user terminal 11 (step ST21: N), the navigation CPU 26 may terminate the processing in FIG. 8.

In a case where the received data 34 has been received from the user terminal 11 (step ST21: Y), the navigation CPU 26 may select one of the sections 51 (step S22).

The navigation CPU 26 may count the number of the spots included in the identical section 51 selected from the received data 34. The navigation CPU 26 may determine whether or not the number of the spots is equal to or larger than a threshold (step ST23).

The threshold may be set according to, for example, how many spots the spot guidance image in FIG. 6 or 7 is able to display.

In a case where the number of the spots is not equal to nor larger than the threshold (step ST23: N), the navigation CPU 26 may bring the processing to step ST26.

In a case where the number of the spots is equal to or larger than the threshold (step ST23: Y), the navigation CPU 26 may divide the selected section 51 into two or more sections 52 (step ST24).

The division processing of the selected section 51 may be made as follows. For example, the navigation CPU 26 may divide the number of the spots by a value of the threshold, and round up the resultant value of the division, to obtain a division number.

Thereafter, the navigation CPU 26 may divide the selected section 51 evenly by the division number.

For example, assume that the upper middle section 51 in FIG. 4 is selected. Because the selected section 51 includes many pieces of the spot data, the selected section 51 may be divided vertically and laterally as denoted by broken lines in the figure, into the four sections 52.

Thereafter, the section attributes attached to the plurality of pieces of the spot data included in the selected section 51 may be updated with the respective sections 52 after the division (step ST25). The sections 52 after the division may include the addresses regarding their respective pieces of the spot data.

After making the division processing of the selected section 51, the navigation CPU 26 may determine whether or not the division processing as described above has been made for all the sections 51 included in the received data 34 (step ST26).

Moreover, in the case where the number of the spots is not equal to nor larger than the threshold (step ST23: N), the navigation CPU 26 may also determine whether or not the division processing has been made for all the sections 51 included in the received data 34 (step ST26).

In a case where the division processing has not been made for all the sections 51 (step ST26: N), the navigation CPU 26 may bring the processing back to step ST22. The navigation CPU 26 may select another one of the sections 51 from the received data 34, and repeat the processing as described above.

In a case where the division processing has been made for all the sections 51 (step ST26: Y), the navigation CPU 26 may terminate the processing in FIG. 8.

As described, in this implementation, it is possible to reduce the number of the spots included in each of the sections 51 to the threshold or less, in the received data 34 to be stored in the navigation memory 27.

For example, in the spot guidance image in FIG. 6, the pieces of the spot data are displayed on the navigation display 22 in units of the sections 51 in association with the current position of the automobile 1. The pieces of the spot data are associated with their respective sections 51, or the sections 52 into which the section 51 is divided as necessary.

As the current position of the automobile 1 is moved along the route, the pieces of the spot data are switched in turn, in units of the sections 51 or the sections 52 into which the section 51 is divided as necessary. Thus, the pieces of the spot data are appropriately displayed on the navigation display 22.

Moreover, in some cases, the sections 51 created in the user terminal 11 are so large in size, and each of the sections 51 includes too many spots to an inappropriate extent for use in the onboard navigation device 21. Even in such cases, the onboard navigation device 21 may divide the section 51 into the sections 52 each of which includes the moderate number of the spots. Hence, it is possible to prevent hindrance to the processing in the onboard navigation device 21.

For example, even in a case where actually a plurality of spots are densely located as in, for example, an urban area, it is possible to reduce the number of the spots in each of the sections 51 and the sections 52 to an appropriate value for use in the onboard navigation device 21.

The terminal CPU 15 and the navigation CPU 26 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the terminal CPU 15 and the navigation CPU 26 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the terminal CPU 15 and the navigation CPU 26 illustrated in FIG. 2.

Although the technology has been described in terms of exemplary implementations, it is not limited thereto. It should be appreciated that variations may be made in the described implementations by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A spot search device, comprising:
    at least one of a mobile information terminal that is allowed to be carried by a user and a computer device that is allowed to be used by the user at home, the at least one of the mobile information terminal and the computer device including:
        a communication device configured to communicate with a server device on a network;
        a processor configured to search over information on the network with use of the communication device; and
        a memory coupled to the processor, wherein
            the memory is configured to store a program, and
            the processor is further configured to execute the program stored in the memory to:
                generate route information that indicates a route from a departure point of a vehicle to a destination of the vehicle;
                store search history information in the memory, wherein the search history information includes spot information that indicates at least one of a service and a product provided at a spot, the spot being searched by the user over the information on the network;
                generate a spot genre based on the spot information included in the search history information;
                extract, from the information on the network, information on one or more spots around the route of the vehicle, based on the spot genre and the route information, the one or more spots around the route of the vehicle indicating the one or more spots located in regions along the route of the vehicle; and transmit the information on the one or more spots around the route and the route information, to an onboard navigation device installed on the vehicle with the communication device, wherein the information on the one or more spots around the route cause the onboard navigation device to update navigation data stored in the onboard navigation device.

2. The spot search device according to claim 1, wherein the processor is further configured to attach section information to the information on the one or more spots around the route, the section information including a plurality of sections into which the regions along the route of the vehicle is divided.

3. The spot search device according to claim 2, wherein the processor is further configured to extract the information on the one or more spots around the route, further based on a fixed genre set in advance.

4. The spot search device according to claim 1, wherein the processor is further configured to extract the information on the one or more spots around the route, further based on a fixed genre set in advance.

5. The spot search device according to claim 1,
wherein the communication device is configured to be coupled to Internet,
wherein the search history information includes information on web pages for which the user searched in the Internet.

6. The spot search device according to claim 1, wherein the processor is further configured to extract, from the information on the network, the information on the one or more spots around the route of the vehicle, further based on a distance from each of the one or more spots around the route of the vehicle.

7. The spot search device according to claim 1, wherein the processor is further configured to extract, from the information on the network, the information on the one or more spots around the route of the vehicle, further based on a distance from each of the one or more spots to the route of the vehicle.

8. A navigation system comprising:
an onboard navigation device installed on a vehicle; and
a spot search device, wherein the spot search device includes:
at least one of a mobile information terminal that is allowed to be carried by a user and a computer device that is allowed to be used by the user at home, the at least one of the mobile information terminal and the computer device including:
a communication device configured to communicate with a server device on a network;
a processor configured to search over information on the network with use of the communication device; and
a memory coupled to the processor, wherein
the memory is configured to store a program, and
the processor is further configured to execute the program stored in the memory to:
generate route information that indicates a route from a departure point of the vehicle to a destination of the vehicle;
store search history information in the memory, wherein the search history information includes spot information that indicates at least one of a service and a product provided at a spot, the spot being searched by the user over the information on the network;
generate a spot genre based on the spot information included in the search history information;
extract, from the information on the network, information on one or more spots around the route of the vehicle, based on the spot genre and the route information, the one or more spots around the route of the vehicle indicating the one or more spots located in regions along the route of the vehicle; and
transmit the information on the one or more spots around the route and the route information, to the onboard navigation device installed on the vehicle with the communication device,
wherein the information on the one or more spots around the route cause the onboard navigation device to update navigation data stored in the onboard navigation device.

9. The navigation system according to claim 8,
wherein the communication device is configured to be coupled to Internet,
wherein the search history information includes information on web pages for which the user searched in the Internet.

* * * * *